INVENTOR
Benson M. Austin
BY Jacobi & Davidson
ATTORNEYS

INVENTOR
Benson M. Austin

BY Jacobi & Davidson

ATTORNEYS

INVENTOR
Benson M. Austin
BY Jacobi & Davidson
ATTORNEYS

United States Patent Office

Re. 26,916
Reissued June 23, 1970

26,916

RADIANT ENERGY METHOD AND APPARATUS OF DETERMINING PHYSICAL CHARACTERISTICS

Benson M. Austin, Pottersville, N.J., assignor to Affiliated Manufacturing Corporation, a corporation of New Jersey Original No. 3,357,557, dated Dec. 12, 1967, Ser. No. 476,031, July 30, 1965. Application for reissue Dec. 10, 1968, Ser. No. 786,502

Int. Cl. B07c *3/14*

U.S. Cl. 209—74 22 Claims

Matter enclosed in heavy brackets [ ] appears in the original patent but forms no part of this reissue specification; matter printed in italics indicates the additions made by reissue.

ABSTRACT OF THE DISCLOSURE

Accuracy of dimensions of small bodies with flat upper surfaces are assured by feeding the bodies on a support surface past a sensing station having a radiant energy emitter directing energy onto the station, and a detector for detecting the magnitude of energy reflected off of either the support surface or body at the station. An air the bodies which reflect substantially less energy than the bodies which reflect substantialy less energy than the support surface and therefore have an upper surface which is not parallel to the support surface.

This invention relates to a method of, and apparatus for, determining the propriety of the physical characteristics and/or position of a body. More particularly, this invention relates to a method of, and apparatus for, determining whether or not a given body has the desired physical characteristics and/or desired orientation by reflecting radiant energy from a body in order to determine the propriety of characteristics and orientation of physical features on a side of the body hidden from view.

Consistent with the foregoing, the invention provides a method and apparatus for sensing the relationship of one surface of an object to another surface of the same object and/or to the surface of another object on which the original object is positioned. The invention finds utility (1) in inspecting the flatness and parallelity of one common surface to another within a given object; (2) in detecting camber or warpage within a given object; and, (3) in establishing orientation of a given part which has a reflective surface which may be transparent or opaque, and which is handled with patterned protrusions, designs or configurations facing downwardly so as to be hidden from view in normal operation.

While the invention can be utilized for the inspection, detection and/or orientation of transistors, diodes, integrated circuits, microcircuits, flat substrates, tubes, bars, ceramics, glass laminations and the like, the varied applicability of the invention can possibly most readily be comprehended if discussed in connection with the handling of an opaque body which has first and second opposed surfaces, with at least the first surface properly and desirably having physical contour features thereon, and with at least the second surface being reflective of the radiant energy. In this regard, consider for example, transistor chips or dice, which have a flat top surface and also a bottom surface with contact points projecting therefrom. Assume that such chip is to be fed to a given device and/or handled in the future, and further assume that one wishes to determine whether or not all of the contact points or projections are present, and/or whether or not the chip is oriented with the projections in the proper position or relative orientation.

Consistent with the invention, these determinations would be made by placing the transistor chip with the contact points or projections facing downwardly on a support surface, and by then reflecting radiant energy off the top surface of the transistor. If the orientation of the part being inspected was to be determined, and/or if one wishes to determine whether all contact projections were present and/or if there was any warpage, bend, or twist in the unit, then the same technique would be followed—i.e., radiant energy would be directed onto and reflected from the face of the body undergoing inspection opposite that having the desired physical contour features thereon.

Even though transistor chips or dice have been used as the basis of the example in the preceding discussion, it will be readily appreciated that there are various component parts which can be handled more easily if an inspection of the physical characteristics thereof can be obtained automatically. Visual inspection in and of itself is normally both time consuming and laborious, and thus, a method and apparatus for conveniently rapidly and automatically sensing the physical characteristics of a body and selectively rejecting those bodies without the desired characteristics is needed for a multiplicity of operations.

The present invention has as its primary object the provision of a mehod and apparatus which will comply with the requirements set forth in the preceding paragraph and satisfy the aforesaid needs. More particularly, it is primary object of the present invention to provide a simple and easily performed method of determining the propriety of the physical characteristics of a body which is at least reflective of and may be opaque to, radiant energy, which body has first and second surfaces and wherein the method and apparatus operate with radiant energy (a) to sense whether or not the body possesses the desired physical characteristics; (b) if desired, to also sense whether or not the body is properly oriented; and/or, (c) to sense the relative position or plane of one of the body surfaces with respect to another (e.g., the plane of the inclined surface of a wedge-shaped piece).

A further important object of the present invention is to provide such a method and apparatus which also operates to remove a body not possessing the desired physical characteristics and/or not properly oriented, from a given path of travel, preferably a support surface or track serving to define a path of movement for the bodies being inspected.

Additional, yet significant and important objects of the present invention include (a) the provision of a method and apparatus conforming with the preceding objects wherein the bodies being inspected move along a support surface to and past an inspection station, and wherein a radiant energy emitter and radiant energy detector are so positioned with respect to the support surface as to respectively direct radiant energy onto and receive radiant energy from the upper face of a body having it lower face in contact with such support surface; (b) the provision of such a method and apparatus wherein, if desired, the support surface has physical contours or recesses therein adapted to cooperate and/or mate with the physical contour features of a body being inspected whereby the method and apparatus are operative not only to sense the existence of given physical characteristics but additionally, the orientation of the body as it passes an inspection station or location; (c) the provision of such a method and apparatus wherein the bodies undergoing inspection can be easily moved to and through an inspection station, or successive inspection stations by vibratory motion, and wherein those bodies not properly oriented and/or not possessing the desired physical characteristics are automatically ejected from the inspecting path of travel by a simple mechanism, such as, for example, and preferably, a pressurized air stream; (d) the provision of such a method and apparatus wherein the support surface providing the inspecting path of travel comprises a series of surfaces disposed in different planes so that bodies of such surface pass in "single file" to an inspection station or successive inspection stations where radiant energy emitter and radiant energy detector means are positioned above the body being inspected with the radiant energy emitter preferably directing the radiant energy vertically onto the body, and with the radiant energy detector being adjustably positioned to receive radiant energy of a given magnitude or value only when the body possesses the required physical characteristics and/or is properly oriented on the support surface for further handling pocedures; (e) the provision of such a method and apparatus which is readily adapted to successively handle a multitude of different bodies, and which further serves to direct the acceptable bodies along one given path and direct the non-acceptable bodies along another given path whereby a body which is not properly oriented can be returned to its initial position for further orientation and repeated inspection, and a body which does not possess the desired characteristics is automatically delivered to a "reject" or "dispose" location; and (f) the provision of such a method which can be easily carried out with relatively simple equipment and the provision of such an apparatus which can be formed from existent components readily available on the commercial market.

A still further significant object of the present invention is to provide a method and apparatus which conforms with all of the preceding objects and which additionally is dependable with repeated operation and relatively small so as to be easily available for use in diverse applications wherever sensing of parallelity or the relationship between parallel surfaces can provide a selected inspection technique on a production line or the like.

In its simplest aspects, the method hereof determines the propriety of the physical characteristics of a body which is at least reflective of, and can be opaque to, radiant energy and which has first and second surfaces, by placing the body in a sensing position with one of the surfaces adjacent and facing a predetermined support surface, by then directing radiant energy onto the body while the body is in such sensing position, and by sensing the radiant energy reflected by the body to determine if the reflective radiant energy is indicative of the proper characteristics of the body. The preferred form of apparatus incorporates a support surface, means for causing a body on the support surface to move therealong, radiant energy emitting means disposed to direct radiant energy onto the support surface in the path of movement of a body therealong, and radiant energy detecting means disposed to receive radiant energy from the radiant energy emitter means as reflected by the support surface and a body moving therealong which has proper characteristics.

Consistent with the preferred aspects of the invention, and in instances where one wishes to determine the propriety of physical contour features on a body, such as the existence of all desired projections or the like on the base face of a transistor chip, as well as the proper orientation of such projections, two sensing stations are utilized. At the first sensing station, a determination is made of the parallelity or existence of all of the projections, and at the second station, a determination is made as to the orientation. These respective operations may be performed at spaced-apart locations while the body is traveling along the same support surface, or alternatively, they may be performed by separate pieces of apparatus.

The invention will be better understood and objects other than those specifically set forth above will become apparent when consideration is given to the following detailed description. Such description makes reference to preferred and illustrative embodiments of the invention shown in the annexed drawings wherein.

Figure 1:
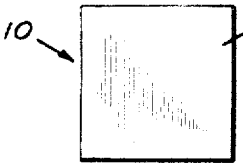
FIGURE 1 is a top plan view of a body such as, for exampe, a transistor chip to be inspected by the method and apparatus hereof.
Figure 2:
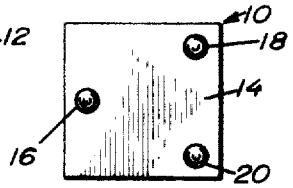
FIGURE 2 is a bottom view of the body shown in FIGURE 1.
Figure 3:
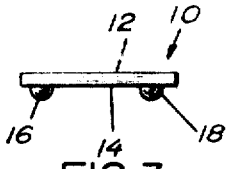
FIGURE 3 is a side view of the body shown in FIGURE 1.

Referring first to FIGURES 1, 2 and 3, there is shown therein a body 10 which has first and second opposed top and bottom surfaces 12 and 14. The bottom surface 14 has physical contour features thereon, namely, projecting contacts, lugs or protrusions 16, 18 and 20. For purposes of this explanation, it can be assumed that the body 10 is a transistor chip or the like and that the protrusions or projections are contact points or semi-spheres. However, as indicated previously, and as will be appreciated from following portions of this description, the body 10 can take various forms, and a transistor chip is merely utilized for exemplary purposes in explaining the instant invention.

The body 10 is presumed to be opaque (although it need merely be reflective, and the top surface 12 thereon is presumed to be the surface from which radiant energy is reflected—i.e., the top surface 12 is essentially a mirror to at least one type of radiant energy directed thereon.

In determining whether or not the body 10 possesses the desired physical characteristics and/or whether the same is properly oriented for a given operation, the method and apparatus of the present invention are utilized. To this end, assume further that it is desired to have the body 10 oriented so that the contact or projection 16 is at the forward end thereof and so that the contacts or projections 18 and 20 are at the rearward end thereof. Further, assume that the body is on a support surface such as the support surface 22 of FIGURES 4, 7 and 8 with the projections or contacts 16–20 facing downwardly so as to not be visibly apparent from the top face of the body. Even further, assume that the body 10 is moving in the direction of arrow A of FIGURE 4 along the track portion and that the forward end of the body is represented by the leading edge thereof in such direction of movement.

If all of the contacts 16, 18 and 20 are properly on the underside 14 of the body 10, then when such body is placed on the support surface 22, the top 12 of the body is disposed in parallel relation to the track portion 23 of support surface 22 during its movement along such track portion. The projections or contacts 16, 18 and 20, being equally dimensioned, support the body with the top surface so disposed.

Figure 7:
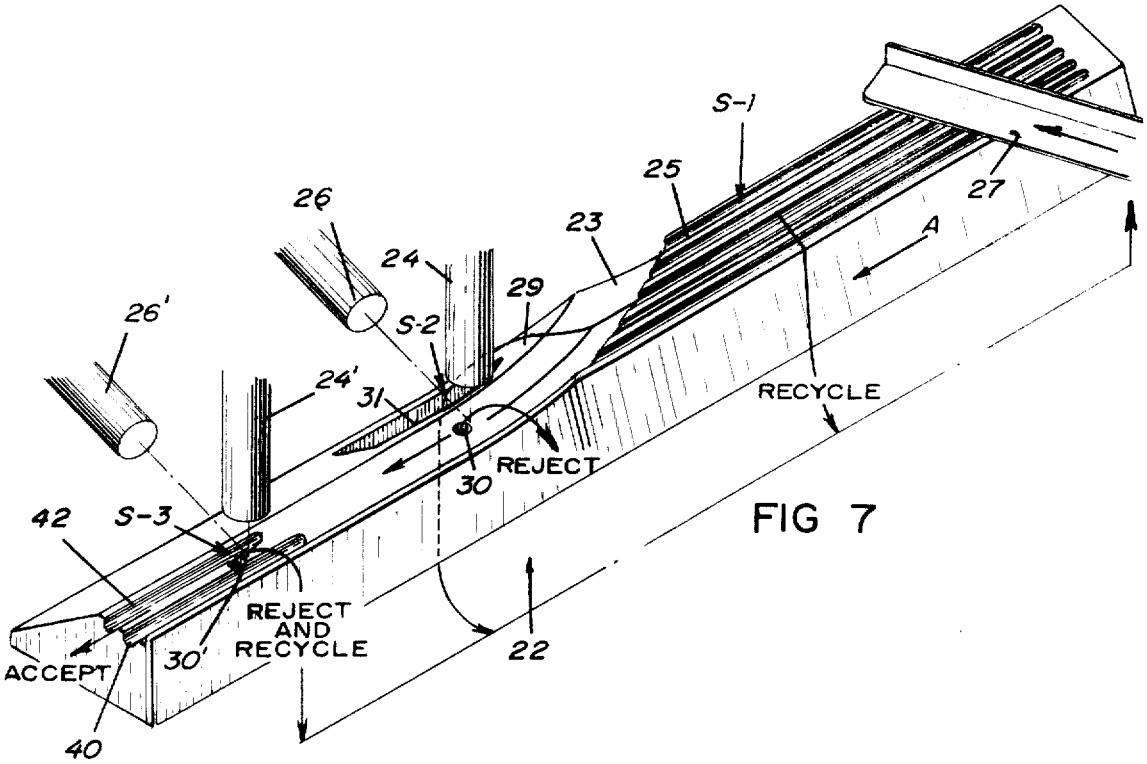
FIGURE 7 is a fragmental perspective view of a support surface such as shown in FIGURE 4, but presenting the same with respective first and second inspection stations cooperating therewith.

As the body moves along the track portion 23, it moves to a first sensing position or location generally designated by the letters S–2 in FIGURE 7. At this location, a radiant energy emitting means 24 is located to direct radiant energy onto the support surface and also onto a body moving therealong. Similarly, a radiant energy detector or sensing means 26 is so disposed as to receive the radiant energy reflected from the support surface 22 and/or the top surface of the body 10 as the body 10 moves along such support surface.

If all of the projections or contacts 16, 18 and 20 are present, and have the desired configuration, and if the respective surfaces 12 and 14 are parallel to one another, as desired, then the radiant energy emitted from the radiant energy emitter 24 is directed onto the top surface of the body and is reflected thereby so that the same passes to the radiant energy detector 26. In this instance, the body is found to possess the desired physical characteristics. If, however, the body did not possess the desired physical characteristics, then and in that event, the radiant energy emitted by the radiant energy emitter 24 would not pass to the radiant energy detector 26 in sufficient quantity—i.e., the radiant energy received by the radiant energy detector 26 would fall below a predetermined value and may even drop to zero.

Figure 5:
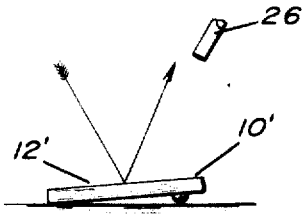
FIGURE 5 is a schematic side view showing the orientation of a body on a support surface when the body does not have the desired physical contour features.
Figure 6:
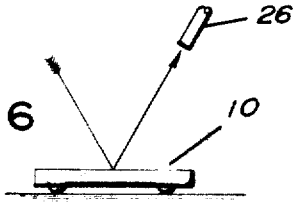
FIGURE 6 is a schematic side view, like FIGURE 5, but presenting a body on a support surface when the body does possess the desired physical contour features.

To better understand the preceding, consider FIGURES 5 and 6. In FIGURE 5, it is assumed that the body 10 has the contacts 18 and 20 thereon properly positioned, but does not have the contact 16 thereon, as desired. Accordingly, this body 10' is tilted with respect to the horizontal, and similarly, would be tilted with respect to the track portion 23 if positioned thereon. Accordingly, any radiant energy which falls upon the top surface 12' of the body 10' when the same was on tack portion 23 would not be directed to the radiant energy receiver or detector 26 and the radiant energy there received would have a magnitude below the predetermined level existent either when no body is on the support surface or when a properly formed body is thereon in the path of the radiant energy. In FIGURE 6, the body 10 is shown as having all of the desired physical features, and in this instance, the radiant energy passing to the radiant energy detector 26, when the body is positioned on the track portion 23, would be above the predetermined level.

Appreciating the relative relationship of the bodies 10 and 10' with respect to a support surface, respectively, when the body has the proper and desired physical contour features and when one or more of such features are lacking, one can better understand the method of operation contemplated by the invention. Specifically, consistent with the invention, bodies of the above-described type are successively placed on a support surface or, in particular, in a sensing position with the bottom surface thereof adjacent and facing the support surface. Radiant energy thereafter is directed onto the body while the same is in the sensing position, and the radiant energy reflected from the body is sensed or detected to determine if the radiant energy, as received, is indicative of the proper characteristics of each body. The reflection of the radiant energy from the support surface 22, or specifically track portion 23 thereof, to the radiant energy detector 26 is sufficient to maintain the elevel of radiant energy or magnitude of radiant energy received by the radiant energy detector 26 above a given value. The radiant energy received by the radiant energy detecting means 26 remains above such predetermined values similarly, when a properly formed body such as the body 10 moves to and past the sensing position along the track portion 23. However, when an improperly formed body such as the body 10' moves to the past the sensing position, then due to the tilting thereof with respect to the track portion 23, the body redirects the radiant energy so that the level of radiant energy, as reflected and received by the radiant energy detector 26, decreases below a predetermined value or to zero.

When the radiant energy decreases below the predetermined value, then it is known that the body being sensed does not possess the desired physical characteristics. To this end, the method hereof contemplates ejecting such bodies from the support surface. Preferably, for this purpose, the track portion 23 of support surface 22 has a bore 30 therein coupled with an air supply hose. When the level of radiant energy detected by the detector means 26 decreases below the predetermined level, then and in that event, an air blast is fed through the hose and bore 30 so that the same is directed against the body then in the sensing position to eject such body from the track portion 23.

In the preceding discussion, reference has only been made to the sensing technique as applied to the invention to determine whether or not the body being inspected has the desired physical characteristics, such as, for example, all contacts 16, 18 and 20. If the body was misformed, so as to be wedge-shaped in cross section, for example, then even with the presence of the contacts, as the body passed and sensing position, the top surface thereof would not be parallel to the support surface 22, and accordingly, essentially the same result would be obtained as with the bodies 10'. Thus, the operation for a body would be essentially the same as the operation already described.

Figure 9:
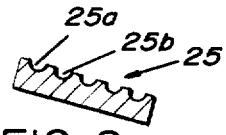
FIGURE 9 is a sectional view taken on the line 9—9 of FIGURE 8.
Figure 10:
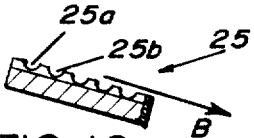
FIGURE 10 is a sectional view taken on the line 10—10 of FIGURE 8.

Having an understanding of the basic sensing technique performed at station S–2 (FIGURE 7), attention can be directed to the preceding operation performed at station S–1 consistent herewith, and the following operation performed at station S–3 consistent herewith. The support surface 22 includes, at station S–1, a grooved surface portion 25 which, as shown in FIGURES 9 and 10, comprises a series of parallel grooves 25a, 25b, etc. These grooves 25a, 25b, etc. terminate along an arcuate path which leads onto the track portion 23 of the support portion 22. The bottom of the grooves 25a, 25b, etc. preferably is disposed at the same level as the upper surface of the track portion 23 so that a body moving in the direction of arrow A (FIGURE 7) is smoothly transferred from the grooved portion 25 to the track 23. If the body has projections on the base thereof, such as the contacts 16–20 referred to previously, then the body will be maintained on the grooved portion 25 after the same is delivered thereto via the input feed surface 27.

Figure 4:
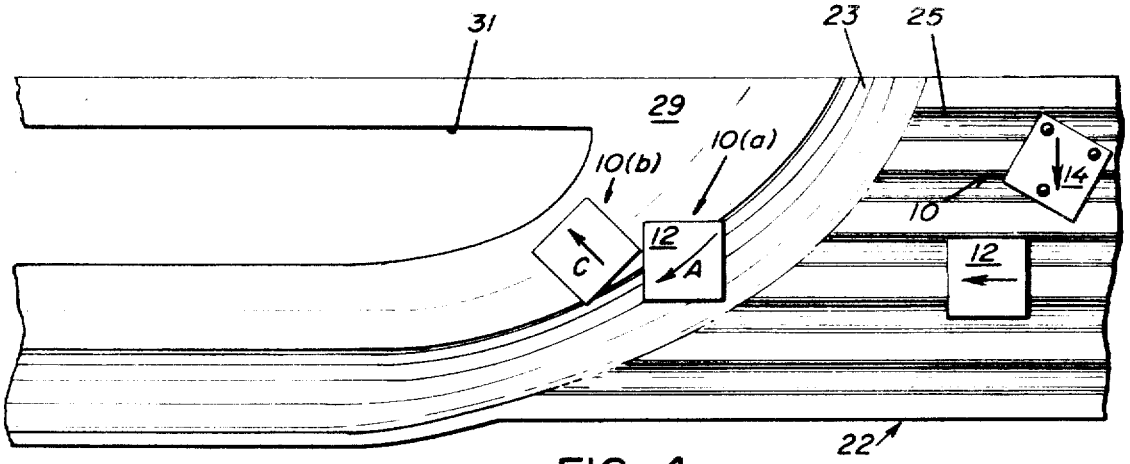
FIGURE 4 is a fragmental top view presenting bodies, such as the body shown in FIGURES 1 through 3, on an associated support surface for radiant energy inspection consistent herewith.
Figure 11:
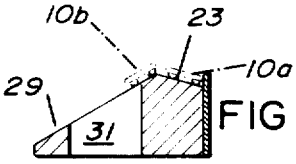
FIGURE 11 is a sectional view taken on the line 11—11 of FIGURE 8.

If, however, the body does not possess any projection thereon, and/or if the body is turned upside down so that the projections face upwardly, then the body will slip off of the grooved portion 25 of the support surface 22 following its delivery thereto by the input feed surface 27. More particularly in this regard, consider FIGURE 10. From this figure, it will be apparent that the grooved surface portion 25 is sloped with respect to the horizontal whereby anybody not having projections thereon or having the projections facing upwardly rather than downwardly will slip off of such grooved surface portion in the direction of arrow B (FIGURE 10). If, however, the body has one or more projections thereon to retain the same on the grooved portion 25, then it will travel, with vibration of the support surface 22 in the direction of the arrow A and onto the track portion 23. As shown in FIGURE 4, more than one body 10 may be on the track portion 23 in a closely spaced location at any given time. The track portion 23, however, is dimensioned so as to support in any given location only a single body, or in this instance, transistor chip 10. Accordingly, as shown in FIGURE 4, if two such transistor chips should appear on the track portion 23 simultaneously, as delivered from the grooved portion 25, then one of the bodies will push the other from the track. In FIGURE 4, the body 10a is shown as pushing the body 10b from the track portion 23. The body 10b thus travels in the direction of arrow C, down an inclined sloped portion 29 of the support surface 22. The relationship between the track portion 23 and the inclined slope portion 29 is possibly best presented in FIGURE 11. Here, the chip 10a is shown as disposed on the track portion 23, whereas the chip 10b is shown as located on the sloped portion 29 of the support surface 22. The sloped portion 29 of the support surface has an opening 31 therein, which opening serves to collect those chips which have been displaced from the track portion 23. These are chips which necessarily have some projections thereon facing downwardly, but which have been displaced from the inspection path of travel in order to insure only one chip at a time passing the sensing station—i.e., "single file" operation at the inspection station S–2.

After a body or chip has been inspected at the inspection station S–2 in the manner explained above, and assuming the same is not rejected by virtue of an air blast passing outwardly through the bore 30, then the chip travels further along the track portion 23 to another inspection station S–3, if desired. At this inspection station, as explained more fully below, a sensing operation is carried out to determine whether or not the projections on the chip are properly oriented. This aspect of the invention is explained more fully below.

Figure 8:
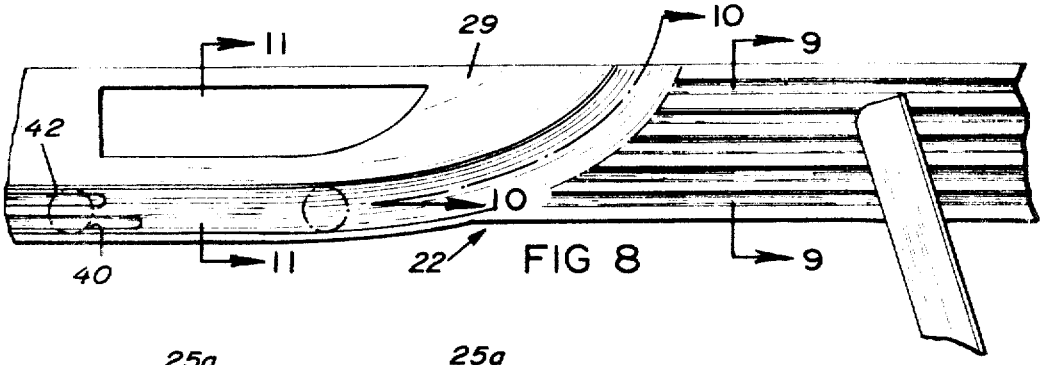
FIGURE 8 is a plan view similar to FIGURE 4, but presenting in further detail the track arrangement shown in FIGURE 7.

Again considering FIGURES 7 and 8, it will be noted that the support surface 22, at station S–3, has recesses therein, namely, the recesses 40 an 42. These recesses are adapted to receive the projections or contacts 16, 18 and 20 only when the body 10 is properly oriented on the track portion 23 for further handling thereof. If the body 10 is properly oriented, then contacts 18 and 20 are received in recess 40 and contact 16 is received in recess 42. As so received, the body during its movement essentially drops slightly with the contacts moving into the recesses, but with the parallelity of the top surface of the body 10 being maintained with respect to the track portion support surface so that the level or magnitude of radiant energy sent from emitter 24, as reflected and received by the radiant energy detector 26' at station S–3 does not drop below the predetermined value as the recesses receive the contacts or physical contour features. Essentially, the contacts simultaneously drop into the respective recesses. However, for positive detection, the sensing station is spaced slightly from the dropping point (i.e., by a minor distance always less than the distance between the two narrowest separated projections).

Now, assume that the body 10 was oriented with the contact 16 adjacent the front edge of the track portion during its path of movement. In this instance, the contact 16 would drop into the recess 40 in the track portion 23 and the contact 20 would drop into recess 42. However, the contact 18 would not drop into any recess prior to inspection at stations S–3. The body 10 would thus be oriented as shown so that its top surface was tilted with respect to the track portion 23 and this in turn would result in directing the radiant energy away from the radiant energy detector 26' so that the magnitude or level of radiant energy received by the radiant energy detector would be below a predetermined value. Accordingly, by merely providing a series of recesses such as the recesses 40 and 42, the method hereof provides for determining the proper orientation of physical characteristics.

The aforesaid decrease in radiant energy received by detector 26' is used in turn, as a signal to sense and/or operate an ejector arrangement such as a gas blast ejection system as provided through the bore 30 described above, but in this instance, the blast pass through bore 30' to eject the mis-oriented part or body. The bodies which are rejected at station S–3 have been determined to have the proper projections thereon since they pass the station S–2 without being ejected. Here, then, the parts are suitable for use, but they are merely not properly oriented for further operations. Thus, these parts or bodies are recycled to the input station S–1, in a manner described more fully below, so that they can again pass through the system. This is in contrast with the parts which are ejected from the station S–2. Such parts as ejected from the station S–2 are defective and accordingly are not recycled.

It will be appreciated that the operation can be performed in the manner specified by using separate pieces of apparatus to perform first the parallelity sensing operation (operation at station S–2) and to thereafter perform the operation at station S–3. In this instance, one piece of apparatus would comprise stations S–1 and S–2, whereas the other piece of apparatus would comprise stations S–1 and S–3 so that the latter piece of apparatus merely would operate to continually and quickly achieve an output of properly oriented components.

With an understanding of the preceding discussion, it will be appreciated that the method hereof determines the propriety of the physical characteristics and/or orientation of bodies by (1) placing the bodies successively in one or more sensing position with one surface of each body adjacent and facing a support surface; (2) directing radiant energy onto the body while the same is in the sensing position or positions; and (3) sensing the magnitude of radiant energy reflected from the body at a predetermined location, namely, the radiant energy detector means 26 or 26' to determine if the reflected radiant energy has a magnitude indicative of the proper position and/or characteristics of the body in the particular sensing position. The method further contemplates the step of ejecting each body from the support surface 22 when the radiant energy reflected therefrom has a magnitude below a predetermined value at the predetermined location.

The preferred form of overall apparatus for carrying out the method hereof is shown in FIGURES 12 through 15. Such apparatus basically includes, in its preferred form, an elongated support surface 22, vibrating means 52 for causing a body on the support surface to move therealong, radiant energy emitting means 54 disposed to direct radiant energy onto the support surface in the path of movement of a body therealong, and radiant energy detecting means 56 disposed to receive radiant energy from the radiant energy emitting means as reflected by the support surface and a body having proper physical contour features moving therealong.

Figure 14:
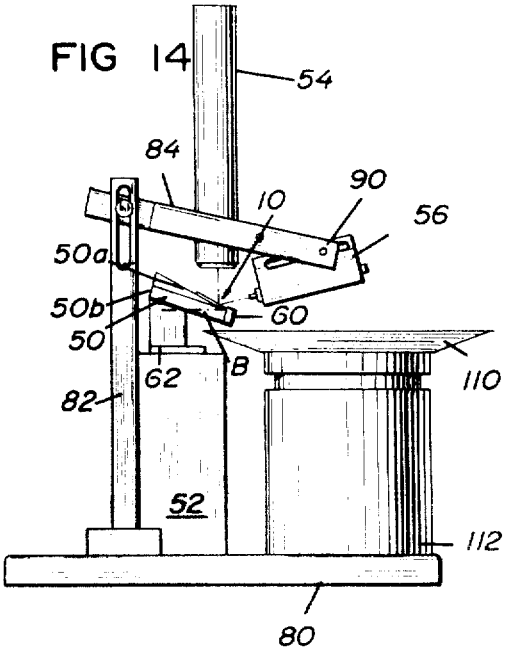
FIGURE 14 is also an end view, but taken from the opposite end of the apparatus shown in FIGURE 12.

As possibly best shown in FIGURE 14, the support surface 22 carries an upstanding forward flange 60 for retaining a body (shown in phantom) on the support surface after it leaves the ground portion thereof referred to above. The support surface member 50 is mounted by any suitable mechanical means such as the mechanical connection generally designated by the numeral 62 in association with the vibrating means 52 so that the vibrating means imparts a vibratory motion to member 50 and in turn the support surface 22, whereby bodies move along the support surface in the direction of the sensing location 70.

Figure 13:
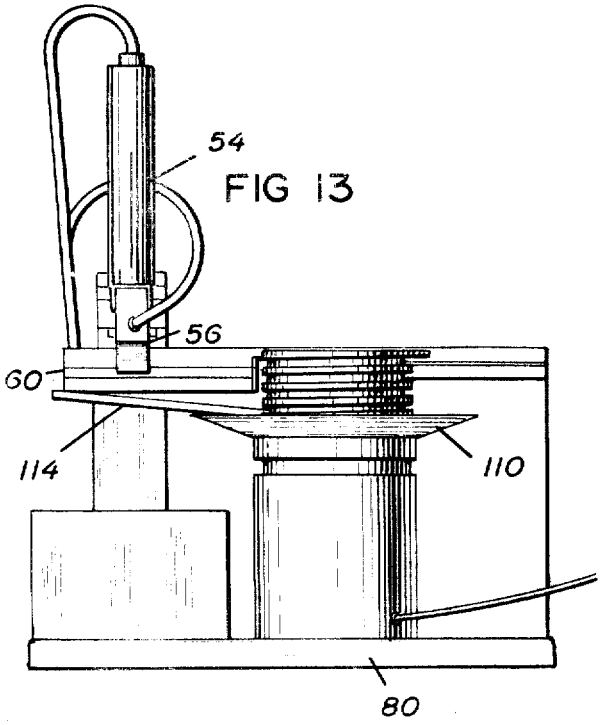
FIGURE 13 is an end view, taken from the left end of FIGURE 12, of the apparatus shown in FIGURE 12.
Figure 12:
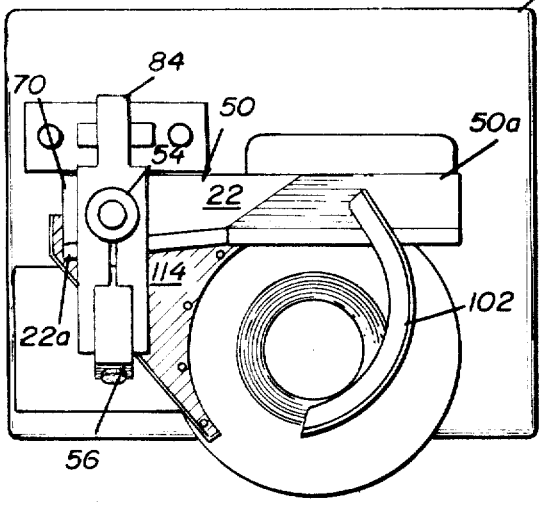
FIGURE 12 is a top plan view of an apparatus constructed in accordance herewith for carrying out the method hereof.

By comparing FIGURES 13 and 14, it will be noted that the support surface member 50 is angularly mounted longitudinally with respect to the horizontal. Specifically, the rearward end portion 50a is slightly elevated with respect to the forward end portion 50b of the track or support surface. With this disposition of the support surface, the bodies are urged to move along the support surface due to the vibratory motion and gravity thereof whereby the bodies pass to and through the sensing location 70 (FIGURE 12).

The apparatus hereof preferably incorporates a base frame 80 having an upstanding support 82 secured thereto and serving as a means for mounting the radiant energy emitting means and the means for mounting the radiant energy detecting means. The upstanding support 82 carries thereon a laterally extending arm means 84 projecting from the upstanding support above the support surface member 50. The arm means 84 has the radiant energy emitting means 54 mounted therein, and also has the radiant energy detecting means 56 adjustably secured thereto by means of screws such as the screws 90. The screws serve as adjustable means for selectively positioning the radiant energy detecting means with respect to the support surface member 50.

The radiant energy emitting means 54 is preferably a light source capable of directing a well defined beam vertically downward onto the track. For this purpose, suitable filters and/or lenses and/or combinations thereof can be used in association with the light source 54, in any conventional manner to obtain the desired well-defined radiant energy beam schematically represented in the drawing by the numeral 100. Such beam is reflected either from the support surface 22 or from a body moving therealong so that it passes to the collector inlet 102 of the radiant energy detecting means 56.

The radiant energy detecting means can comprise, for example, a photoelectric cell having suitable lenses or filters associated therewith in combination with the collector or collimating tube 102 whereby the reflected radiant energy is detected as having a magnitude above a predetermined level whenever the radiant energy is merely reflected from the support surface 22 or a properly formed body moving therealong. The radiant energy detector means and its associated components function essentially as an "off-on" or "go—no-go" system. In essence, the radiant energy detecting means and radiant energy emitting means are focused with respect to one another to maintain the magnitude of radiant energy, as received by the radiant energy detecting means above a given value under both of the conditions mentioned immediately above. However, the focusing is such that radiant energy reflected from a body which is either not properly formed and/or not properly oriented, as it travels along the support surface 22 is not directed immediately into the collector or collimating tube 102, thus reducing the magnitude of received radiant energy under this condition.

While a light source and simple photoelectric cell alone and/or in combination with focusing means such as lenses and filters are preferably utilized in accordance herewith, it will be understood that various other forms of radiant energy emitters and detectors can be incorporated without departing from the scope and spirit of the invention. Similarly, the relative positions of the radiant energy emitter and radiant energy detector may be adjusted to one another so as to permit and/or define the acceptable reflection limits.

As shown in FIGURES 12 through 15, the parts or bodies to be inspected are preferably initially disposed in a vibratory feeder bowl 110 supported by a vibratory feeder base 112. Such a vibratory feeding mechanism is conventional and well known in industry. The same operates so that the parts travel up a spiral track in the bowl and then along the input feed surface 27 which takes the form of a spout 110a so as to be dispensed onto the grooved portion 25 of support surface 22. The vibratory motion of the support surface member 50 and its contoured support surface 22 orient the parts so that they will be presented, as explained, one at a time for the inspection or sensing operation.

Preferably, the air ejecting mechanism, which may comprise any suitable source of gas under pressure linked to the bore 30 or 30' is so disposed as to cause the rejected parts to leave the support surface 22. If the inspection is for orientation, the parts preferably fall onto a rejected part return funnel 114 which directs the parts back into the feeder bowl 110 for further inspection. The accepted parts pass along the support surface 22 leaving the end 22a thereof and falling into a suitable receptacle (not shown) or passing further to an additional apparatus (not shown) or means receiving the same as positively positioned for further processing.

In FIGURES 12 through 15, the apparatus has been shown as constructed for purposes of performing a single sensing operation. More specifically, this apparatus, as shown, is adapted particularly to determine the orientation of components. However, the same apparatus can be used to determine the parallelity or existence of the desired physical contour features. If so used, the return funnel 114 would feed to a reject storage container or the like (not shown) and would not return the parts to the feeder bowl 110.

In other words, the apparatus of FIGURES 12 through 15 represents an apparatus including a single inspection station. Consistent herewith, such an apparatus would be provided with the return funnel 114 leading to a reject storage (not shown) initially so that all parts not possessing the necessary projections and/or parallelity and/or physical contour features would be rejected. The accepted parts, however, would travel to a further apparatus, identical with the apparatus initially used, but where the rejected parts would return to the feed bowl. This apparatus would thus differ from that used at the initial station only in that the parts were returned to the feed bowl and only in that the support surface carried some means thereon, such as the recesses previously described, for determining proper orientation.

It will be readily appreciated that while two separate units may be utilized, the support surface may be integrated in a single unit which operates in the manner described previously and which includes an elongate support surface such as shown in FIGURE 7 with two sensing stations associated therewith.

As shown in FIGURE 12, the radiant energy detector means 56 feeds its output to an amplifying means 120 which in turn feeds its output to an ejector mechanism 122. The ejector mechanism, solely by way of example, include a solenoid 124 which is normally energized by the output of the amplifier 120 so as to maintain the valve 126 in its closed position. When the magnitude of reflected radiant energy falling on the photocell 56 decreases below a predetermined value, then the output of the amplifier decreases below a predetermined value, and in turn, the ejector mechanism or specifically the solenoid 124 is deactivated, thereby opening the valve 126 and permitting gas under pressure to flow through a supply line or hose 32 which in turn ejects a part from the support surface 22 because such part either is not properly oriented, or does not possess the desired physical contour features. As indicated above, the line 32 is connected with a source of gas under pressure such as compressed air (not shown). The ejector arrangement would essentially be the same for both sensing stations incorporated should a single apparatus be used rather than separate units for performing the successive sensing operations.

Figure 15:
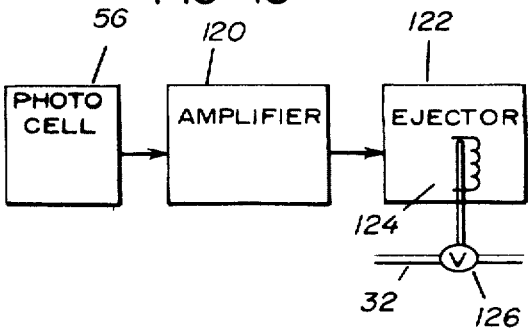
FIGURE 15 is a schematic diagram of a portion of the operating mechanism of the apparatus.

While a solenoid operated valve mechanism is shown in FIGURE 15, it should be understood that other types of control for the ejector mechanism may well be employed particularly in instances where very high speed operation is required. Thus, as indicated, the arrangement of FIGURE 15 and the description thereof is presented only for exemplary purposes.

While the embodiment of the invention discussed in detail above has assumed that the support surface is elongated, a modified embodiment of the invention contemplates using a circular or turn table type of support surface. In this regard, consider FIGURE 16. Here, the support surface 22' includes a grooved entry portion 25' which receives bodies, or consistent with the preceding example, transistor chips, from an input feed surface 27' in the form of spout 110'. The transistor chips then pass on to the track portion 23' and align themselves in "single file" with any stacking of parts being eliminated by virtue of the parts slipping off the sloped surface 29' and being returned through the return aperture 31'. The parts which are aligned in "single file" on the track portion 23' pass to a first sensing station S–2' and then to a second sensing station S–3'. The operation performed at these respective sensing stations is the same as the operations performed at the sensing stations S–2 and S–3, as explained in connection with FIGURE 7. The parts which are accepted then move further along the arcuate support surface being collected by an output chute 115 which delivers the same to a storage container of the like 116, or which alternatively, delivers the parts which have been accepted to further processing equipment (not shown). The operation of the circular support surface arrangement is virtually identical with the operation of the elongated support surface arrangement, and accordingly, repeating the details thereof appears unnecessary.

Figure 16:
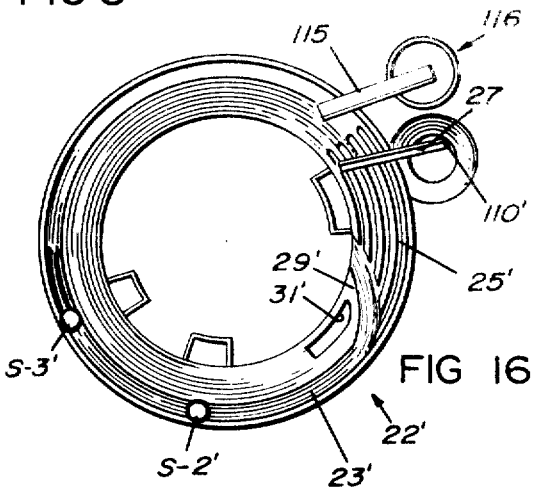
FIGURE 16 is a top plan view of a modified form of support surface which can be utilized in accordance with a modified embodiment of the present invention.

The track or support surface of FIGURE 16 can be vibrated just as the track or support surface of the previously described embodiment can be vibrated. However, while imparting movement to the bodies being inspected by vibratory motion is preferred, it should be understood that various methods can be used to move the bodies to and through respective inspection stations.

Having now described preferred embodiments of the invention in considerable detail, it should be apparent that the objects set forth at the outset of the present specification have been successfully achieved. Accordingly,

What is claimed is:

1. A method of determining the propriety of the physical characteristics of a body opaque to radiant energy, which body has first and second opposed surfaces, said method comprising the steps of:

(a) placing said body in a sensing position with one of said surfaces adjacent and facing a predetermined support surface which is disposed at an angle with respect to the horizontal;

(b) directing radiant energy vertically onto said other surface of said body while said body is in said sensing position; and (c) sensing the radiant energy reflected from said body to determining if the reflected radiant energy is indicative of the proper characteristics of said body.

2. The method defined in claim 1 wherein step (c) is carried out by sensing the magnitude of reflected radiant energy at a predetermined location, and further including the step of:

(d) ejecting said body from said support surface when the magnitude of said reflected radiant energy at said predetermined location is below a predetermined value.

3. The method defined in claim 1 wherein step (a) is performed by placing said bodies in said support surface and then moving said bodies along said support surface to and past said sensing position, wherein step (c) is carried out by sensing the magnitude of reflected radiant energy at a predetermined location, and further including the step of:

(d) ejecting any body from said support surface at said sensing position when the magnitude of said reflected radiant energy at said location is below a predetermined value.

4. A method of assuring the perfectness of dimensions of each of a plurality of bodies each having a top surface comprising the steps of:

(a) placing said bodies on a support surface;

(b) continuously directing radiant energy onto said support surface at a sensing station;

(c) sensing the magnitude of said energy which is reflected at said sensing station;

(d) continuously moving said bodies over said support surface and past said sensing station so that each of said bodies passing said sensing station will, instead of said support surface, reflect off of said top surface, said radiant energy; and (e) ejecting from said support surface any body which at said sensing station, reflects radiant energy at a level below that which would indicate that no body was at said station or that a body of proper dimension was there.

5. The method defined in claim 4 wherein said ejecting step is carried out by forcing an air blast against said body to eject the same.

6. The method defined in claim 4 wherein said radiant energy is light.

7. The method defined in claim 4 wherein said bodies are moved over said support surface by vibrating said support surface.

8. The method defined in claim 4 wherein said top surface is flat and said dimensions are accurate when said top surface is parallel to said support surface.

9. Apparatus for determining the propriety of physical characteristics of an opaque body having first and second opposed surfaces with at least the first surface properly having physical contour features thereon and with at least the second surface being reflective of radiant energy, said apparatus comprising in combination:

(a) an elongated support surface;

(b) means for causing a body on said support surface to move therealong;

(c) radiant energy emitting means disposed to direct radiant energy onto said support surface in the path of movement of a body therealong;

(d) radiant energy detecting means disposed to receive radiant energy from said radiant energy emitting means as reflected by said support surface and a body having proper physical features moving therealong; and (e) recesses is said support surface for receiving said physical contour features, said recesses being disposed to receive said features when a body is in the path of radiant energy emitted by said radiant energy emitting means.

10. The combination defined in claim 9 and further including ejector means for ejecting a body from said support surface when the magnitude of reflected radiant energy received by said radiant energy detecting means is below a pretdetermined value.

11. The combination defined in claim 10 wherein said ejector means comprises means for directing a pressurized gas stream against the body to eject the same from said support surface.

12. Apparatus for determining the propriety of physical characteristics of an opaque body having first and second opposed surfaces with a least the first surface properly having physical contour features thereon and with at least the second surface being reflective of radiant energy, said apparatus comprising in combination:

(a) a frame;

(b) an elongated track having a support surface thereon;

(c) means mounting said track on said frame with said support surface disposed at an angle to the horizontal;

(d) means for causing a body on said track to move along said support surface;

(e) radiant energy emitting means;

(f) means mounting said radiant energy emitting means to direct radiant energy onto said support surface in the path of movement of a body therealong;

(g) radiant energy detecting means for receiving radiant energy from said radiant energy emitting means;

(h) means mounting said radiant energy detecting means in the path of radiant energy reflected by said support surface and a body having proper physical contour features moving therealong; and (i) ejector means for ejecting a body from said support surface, said ejector means being responsive to said radiant energy detecting means whereby said ejected means is actuated when the said radiant energy received by said radiant energy detecting means has a magnitude below a predetermined value; and (j) recesses on said support surface for receiving said physical contour features of said body when said body is in a given orientation on said support surface and in a given position therealong;

wherein said radiant energy emitter means and said radiant energy detector means are focused to direct radiant energy onto and receive reflective energy from a body in said given position, respectively.

13. The combination defined in claim 12 wherein said means mounting said radiant energy emitting means and said means mounting said radiant energy detecting means comprises an upstanding support secured to said frame and a laterally extending arm means projecting from said upstanding support above said track, and wherein said means mounting said radiant energy detecting means further includes adjustaable means for selectively positioning said radiant energy detecting means with respect to said track portion.

14. The combination defined in claim 12 wherein said means for causing a body on said track to move along said support surface comprises vibrating means for vibrating said support surface member, wherein said radiant energy detecting means comprises photosensitive cell means and means for amplifying the output of said cell means, and wherein said ejector means includes solenoid means responsive to the output of said amplifier means.

15. A method of determining the propriety of the physical characteristics of bodies opaque to radiant energy, which bodies each have first and second opposed surfaces, with at least said first surface properly having physical contour features thereon and with at least said second surface being reflective of said radiant energy, said method comprising the steps of:

(a) successively placing said bodies in position with said first surface adjacent and facing an elongated predetermined support surface disposed at an angle with respect to the horizontal and then moving said bodies along said support surface to a sensing position;

(b) directing radiant energy vertically into said second surface of each body while the same is in said sensing position; and (c) sensing the radiant energy reflected from said second surface to determine if the reflected energy is indicative of the proper characteristics of each body.

16. Apparatus for assuring that each of a plurality of small bodies with flat upper surfaces are of exact predetermined dimensions comprising:

(a) a supports urface inclined with respect to the horizontal;

(b) a vibrator connected with said support surface to vibrate it and induce said bodies to move therealong;

(c) a radiant energy emitter positioned to continuously emit radiant energy onto a sensing station on said support surrface;

(d) a detector for detecting the magnitude of energy reflected from said sensing station, whereby when one of said bodies having an upper surface not parallel to said support surface is at said sensing station said magnitude will fall below a predetermined value.

17. The apparatus defined in claim 16 further comprising an air blast orifice at said sensing station to eject any of said bodies causing said magnitude to fall below said predetermined value.

*18. Apparatus for assuring that each of a plurality of small bodies with flat upper surfaces is of exact predetermined dimensions comprising:*

*(a) a support surface;*

*(b) a radiant energy emitter positioned to continuously emit radiant energy onto said support surface;*

*(c) means to move each of said bodies when supported on said support surface to a position where said energy impinges on said body; and*

*(d) a detector for detecting the magnitude of energy reflected from said support surface or a body receiving said radiant energy, whereby when one of said bodies having a lower surface deviating from the plane of the upper surface of said body causes the radiant energy reflected from said upper surface to fall below a predetermined value.*

*19. The apparatus defined in claim 18 wherein said emitter is positioned to emit said energy substantially vertically downward.*

*20. A method of assuring that each of a plurality of small bodies having a top surface is of exact predetermined dimensions comprising the steps of:*

*(a) placing said bodies on a support surface;*

*(b) continuously directing radiant energy onto said support surface;*

*(c) continuously moving said bodies through said radiant energy so that each of said bodies when impinged upon by said energy will, instead of said support surface, reflect off of said top surface, said radiant energy;*

*(d) sensing the magnitude of said energy which is reflected off of said support surface or body upon which said radiant energy is impinging;*

*(e) ejecting from said support surface any body which reflects radiant energy at a level below that which would indicate that no body was reflecting said energy or that a body of proper dimension was reflecting said energy.*

*21. Apparatus for determining the characteristics and orientation of the physical features of the under side of a body resting upon a supporting surface comprising:*

*a supporting surface;*

*a radiant energy emitter positioned to continuously emit radiant energy on said support surface;*

*means for moving each of said bodies on the support surface to a position where said radiant energy impinges upon the upper surfaces of the bodies; and*

*means for detecting the magnitude of energy reflected from said support surface or from the upper surface of the body receiving said radiant energy, whereby when any of said bodies has physical characteristics on its underside deviating from the plane of the upper surface of said body, the beam of radiant energy reflected from the upper surface will fall below a predetermined value and said body will be ejected.*

*22. Apparatus for determining the propriety of physical characteristics of a body having first and second opposed surfaces with at least the first surface properly having contour features thereon and with at least the second surface being reflective of radiant energy, said apparatus comprising in combination:*

*a frame;*

*a supporting surface mounted in on the frame;*

*means for causing said body on said support surface to move;*

*radiant energy emitting means positioned to direct radiant energy on said support surface in the path of the movement of a body therealong whereby when any of said bodies having physical characteristics on its underside deviating from the plane of the upper surface of said body, the beam of radiant energy reflected from the upper surface will fall below a predetermined value.*

*radiant energy detecting means for receiving radiant energy reflected from said support surface and a body having desired physical contour features moving therealong; and*

*means for ejecting a body from said support surface,*

*said ejector means being actuated when said radiant energy received by said detecting means has a magnitude below such predetermined value.*

References Cited

The following references, cited by the Examiner, are of record in the patented file of this patient or the original patent.

UNITED STATES PATENTS

| | | | |
|---|---|---|---|
| 2,446,628 | 8/1948 | Brown | 356—120 X |
| 1,854,760 | 4/1932 | Paulson | 209—82 |

| | | | |
|---|---|---|---|
| 2,405,483 | 8/1946 | Abrams | 209—83 |
| 2,542,929 | 10/1950 | Razek | 209—111.7 |
| 2,845,177 | 7/1958 | Perkins et al. | 209—111.7 |
| 3,089,594 | 5/1963 | Early | 209—111.7 |
| 3,269,534 | 8/1966 | Clark et al. | 198—220 |

ALLEN N. KNOWLES, Primary Examiner

U.S. Cl. X.R.

209—82, 111.7; 250—224; 356—120, 237